(12) United States Patent
Ishii (10) Patent No.: US 7,602,435 B2
(45) Date of Patent: Oct. 13, 2009

(54) IMAGE-TAKING APPARATUS AND FOCUS CONTROL PROGRAM FOR IMAGE-TAKING APPARATUS

(75) Inventor: Kazunori Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 10/936,250

(22) Filed: Sep. 8, 2004

(65) Prior Publication Data

US 2005/0052564 A1 Mar. 10, 2005

(30) Foreign Application Priority Data

Sep. 9, 2003 (JP) ............................. 2003-317294

(51) Int. Cl.
*H04N 5/232* (2006.01)
(52) U.S. Cl. .................................................... 348/345
(58) Field of Classification Search ................. 348/345, 348/346, 347, 348–354; 396/65
See application file for complete search history.

(56) References Cited

U.S. PATENT DOCUMENTS

| 4,794,417 | A | * | 12/1988 | Sekiguchi et al. ............. 396/50 |
| 5,097,282 | A | * | 3/1992 | Itoh et al. .................... 396/123 |
| 5,212,513 | A | * | 5/1993 | Ishida et al. ................. 396/104 |
| 5,597,999 | A | * | 1/1997 | Kinba et al. ............. 250/201.7 |
| 5,764,285 | A | * | 6/1998 | Ochi et al. ............... 348/222.1 |
| 5,828,637 | A | * | 10/1998 | Kim ........................ 369/44.28 |
| 5,900,927 | A | * | 5/1999 | Hasegawa .................. 356/3.13 |
| 6,377,305 | B2 | * | 4/2002 | Onuki ........................ 348/345 |
| 6,407,968 | B1 | * | 6/2002 | Nakata et al. ............. 369/44.26 |
| 6,496,225 | B1 | * | 12/2002 | Higashihara et al. ........ 348/345 |
| 6,686,966 | B1 | * | 2/2004 | Hashimoto .................. 348/348 |
| 6,781,632 | B1 | * | 8/2004 | Ide .............................. 348/345 |
| 6,819,360 | B1 | * | 11/2004 | Ide et al. ..................... 348/340 |
| 6,853,502 | B2 | * | 2/2005 | Sasaki ........................ 359/698 |
| 6,900,927 | B2 | * | 5/2005 | Honda et al. ................. 359/321 |
| 6,999,684 | B2 | * | 2/2006 | Sato et al. .................... 398/125 |
| 7,209,175 | B1 | * | 4/2007 | Kurokawa et al. .......... 348/345 |
| 7,301,579 | B2 | * | 11/2007 | Shinohara et al. ........... 348/345 |
| 2001/0003465 | A1 | * | 6/2001 | Ito et al. ..................... 348/345 |
| 2002/0067421 | A1 | * | 6/2002 | Tanaka et al. ............... 348/345 |
| 2002/0154241 | A1 | * | 10/2002 | Ohkawara ................... 348/345 |
| 2003/0098921 | A1 | * | 5/2003 | Endo .......................... 348/345 |
| 2003/0156216 | A1 | * | 8/2003 | Nonaka ...................... 348/345 |
| 2003/0189662 | A1 | * | 10/2003 | Matsuda ..................... 348/345 |
| 2004/0263633 | A1 | * | 12/2004 | Shinohara et al. ....... 348/207.99 |

FOREIGN PATENT DOCUMENTS

JP H05 (1993)-64056 3/1993
JP 2002-258147 9/2002

* cited by examiner

*Primary Examiner*—Tuan V Ho
*Assistant Examiner*—Kent Wang
(74) *Attorney, Agent, or Firm*—Cowan, Liebowitz & Latman, P.C.

(57) ABSTRACT

An image-taking apparatus is disclosed which enables the accuracy of re-performance determination of in-focus search control to reliably maintain an in-focus state in response to a condition change after focusing is achieved. The image-taking apparatus comprise a first detector which outputs a focus evaluation value signal and a second detector which outputs a detection signal different from the focus evaluation value signal. The image-taking apparatus comprises a controller which performs a first control for controlling drive of the focus lens such that an in-focus position of the focus lens is searched for on the basis of the focus evaluation value signal. The controller obtains shift information which represents a shift state from an in-focus state based on the detection signal from the second detector after the first control, and performs processing associated with the re-performance of the first control based on at least the shift information.

20 Claims, 8 Drawing Sheets

DISTANCE TO OBJECT $L = \dfrac{B \cdot f}{X}$

FIG.8

IMAGE-TAKING APPARATUS AND FOCUS CONTROL PROGRAM FOR IMAGE-TAKING APPARATUS

BACKGROUND OF THE INVENTION

1. Field of the Invention

The present invention relates to focus control in an image-taking apparatus.

2. Description of the Prior Art

Figure 5:
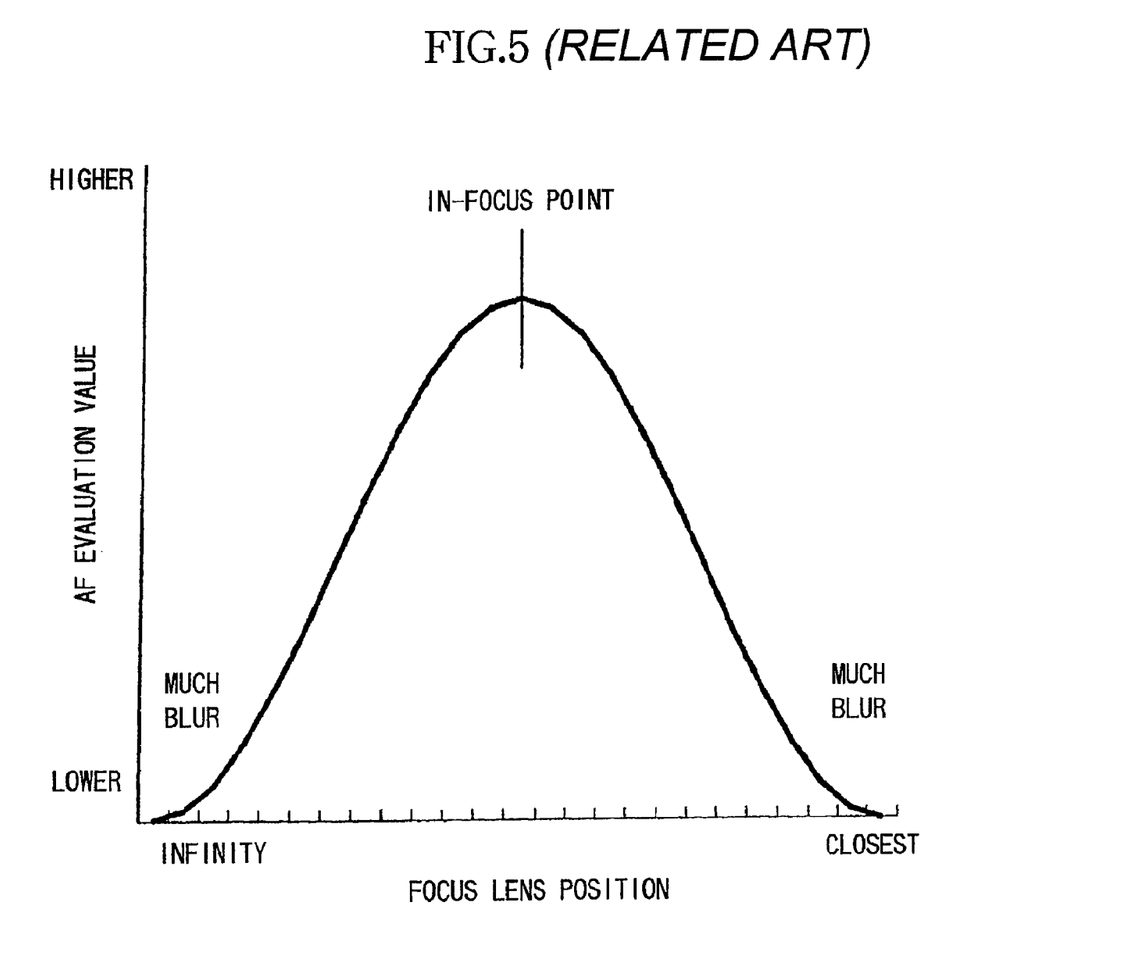
FIG. 5 is a graph showing the principles of auto-focus in the TV-AF method.

A so-called TV-AF method is mainly used for auto-focus (AF) in video cameras. In the TV-AF method, an object image is photoelectrically converted by an image-pickup element or the like into a video signal from which a high-frequency component representing the sharpness of the video is extracted through a band pass filter, and the drive of a focus lens is controlled to search for the position at which an AF evaluation value indicating the sharpness is at the maximum. As shown in FIG. 5, the position at which the AF evaluation value is at the maximum corresponds to an in-focus position.

When focusing is thus achieved, the AF evaluation value at that point is stored. Then, an AF evaluation value taken after the focusing is compared with the stored AF evaluation value (that is, determination of restart is made), and if a difference greater than a predetermined level exists between them, AF control with the TV-AF is restart (re-performed).

In this manner, in the TV-AF method for video cameras, the drive of a focus lens is controlled through repeated cycles of start of AF control, determination of restart, restart of AF control, and determination of restart, thereby achieving control such that the AF evaluation value maintains the maximum in taking moving images.

The AF method includes an external distance measuring method which uses an external distance metering sensor. The method includes, for example, a passive type in which a luminous flux from an object is split into two which are received by two light receiving sensors (line sensors), respectively, and the correlation of signals from the two sensors are calculated. Then, calculations are made to find how many pixels on the line sensors should be shifted to provide the highest correlation. Distance information can be obtained on the basis of the shift amount by using the principles of triangulation. The method also includes an active type in which an ultrasonic sensor is used to measure the distance to an object from the propagation speed of ultrasonic waves. In another active type, an infrared sensor is used to measure the distance to an object with triangulation.

Another AF method is called a TTL (Through the Taking Lens) phase difference detection method. In the phase difference detection method, a luminous flux passing through the exit pupil of an image-taking lens is split into two which are received by a set of light receiving sensors. Then, a displacement amount in signals (phase difference signals) output in accordance with the received light amounts, that is, a relative positional displacement amount in the direction in which the luminous flux is split, is detected to determine a defocus amount of the image-taking lens. A drive amount and a drive direction to reach an in-focus position of a focus lens are directly determined on the basis of the defocus amount. In this manner, in the phase difference detection method, once the light receiving sensors are used to perform electric charge storing operation, the drive amount and the drive direction of the focus lens to reach the in-focus position can be provided, so that focus adjustment operation can be performed at high speed.

Japanese Patent Application Laid-Open No. 2002-258147, Japanese Patent Application Laid-Open No. H05(1993)-64056 and the like have proposed methods in which the AF is performed by combining the aforementioned external distance measuring method or phase difference detection method with the TV-AF method. In these proposals, the external distance measuring method or the phase difference detection method is used to calculate the drive amount and drive direction of a focus lens to reach an in-focus position to move the focus lens to the in-focus position, and then the TV-AF method is used to correct focus to precisely achieve focusing.

As described above, in the TV-AF method, restart is performed when the AF evaluation value is changed even after an in-focus state is achieved. The same processing operation is performed whether the change of the AF evaluation value is large or small. If the distance to an object is largely changed, it may take a long time to attain an in-focus state.

When the distance to an object is changed but the AF evaluation value shows no difference, for example in the case where a lens is focused on a subject different from a true object at a changed distance, the TV-AF is not restarted for the true object and the in-focus state may not be maintained.

SUMMARY OF THE INVENTION

It is an object of the present invention to provide an image-taking apparatus capable of improving the accuracy of re-performance (restart) determination of in-focus search control to reliably maintain an in-focus state in response to a condition change after focusing is achieved in performing focus control which uses a focus evaluation value signal to search for an in-focus position (for example, the TV-AF method), and a control program for the image-taking apparatus.

It is another object of the present invention to provide an image-taking apparatus capable of quickly achieving an in-focus state in re-performing in-focus search control even when the distance to an object is largely changed, and a control program for the image-taking apparatus.

According to one aspect, the present invention provides an image-taking apparatus comprising an image-pickup element which photoelectrically converts an object image formed by an image-taking optical system which includes a focus lens, a first detector which outputs a focus evaluation value signal which represents a focusing state of the image-taking optical system based on a predetermined frequency component of an output signal from the image-pickup element, and a second detector which outputs a detection signal different from the focus evaluation value signal. The image-taking apparatus also comprises a controller which performs a first control for controlling drive of the focus lens such that an in-focus position of the focus lens is searched for on the basis of the focus evaluation value signal. The controller obtains shift information which represents a shift state from an in-focus state based on the detection signal from the second detector after the first control, and performs processing associated with re-performance of the first control based on at least the shift information.

According to another aspect, the present invention provides a control program comprising a step of producing a focus evaluation value signal which represents a focusing state of an image-taking optical system based on a predetermined frequency component of an output signal from an image-pickup element, a step of inputting a detection signal different from the focus evaluation value signal, and a step of performing a first control for controlling drive of a focus lens such that an in-focus position of the focus lens is searched for on the basis of the focus evaluation value signal. The program also comprises a step of obtaining shift information which represents a shift state from an in-focus state based on the detection signal after the first control is performed, and a step of performing processing associated with re-performance of the first control based on at least the shift information.

These and other characteristics of the image-taking apparatus and the control program of the present invention will be apparent from the following description of specific embodiments with reference to the drawings.

DETAILED DESCRIPTION OF THE PREFERRED EMBODIMENTS

First, description is made for terms used in Embodiments of the present invention. "Processing associated with re-performance of a first control" includes, at least, processing of determining whether or not in-focus search control, which is first control, is re-performed on the basis of shift information, and processing of determining whether or not in-focus drive amount control (obtaining a drive amount to an in-focus position of a focus lens based on the shift information to control the drive of the focus lens based on the drive amount) is performed before the in-focus search control is re-performed on the basis of the shift information. In addition, it includes processing of controlling the drive speed of the focus lens in the in-focus drive amount control based on a focus evaluation value signal and processing of controlling the drive speed of a focus lens in the in-focus drive amount control based on the shift information.

The aforementioned "processing" includes processing of controlling the drive start direction of the focus lens in re-performing the in-focus search control based on information indicating a shift direction in the shift information.

A second detector can include, for example, a device which outputs a detection signal for detecting the distance to an object and a device which outputs a phase difference signal in accordance with a focusing state of an image-taking optical system by splitting and receiving light passing through the image-taking optical system.

It is possible to use, as the "shift information indicating a shift state from an in-focus state," information about a shift from an in-focus state such as information about a difference of an actual position from an in-focus position of the focus lens and its direction, phase difference information in a signal output from a light receiving sensor for use in the phase difference detection method, and information about a defocus amount and a defocus direction of the image-taking optical system taken from the phase difference signal.

(Premise Technology)

Figure 6:
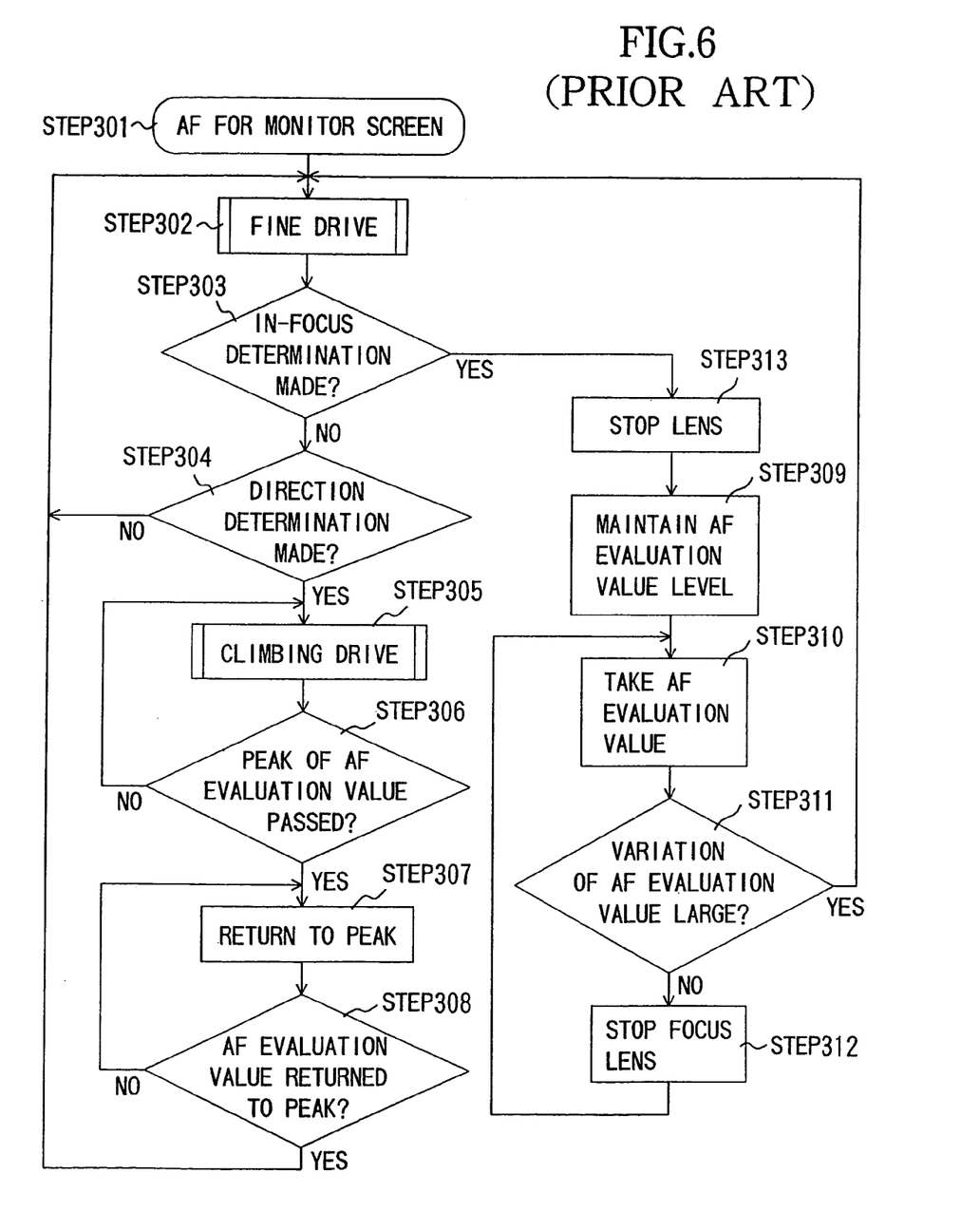
FIG. 6 is a flow chart showing the conventional algorithm of restart processing of TV-AF.

Prior to description of Embodiments of the present invention, description is made for the general outlines of TV-AF (in-focus search control) which is premise technology of the present invention. FIG. 6 shows a flow chart of control of the TV-AF.

In FIG. 6, after TV-AF control is started (step 301), fine drive of a focus lens 105 is performed (step 302). The "fine drive" refers to control in which the focus lens is driven to reciprocate in an infinite direction and a closest direction in predetermined small amounts to provide a change in an AF evaluation value signal (an increase in the AF evaluation value signal) which is used to detect a direction in which an in-focus position is likely to exist. In the fine drive, when the same direction is determined as the in-focus direction a predetermined number of times in succession, that direction is determined as the direction in which an in-focus position exists. When the focus lens repeats reciprocation in the same area a predetermined number of times, the area is determined as an in-focus position. In this case, the flow moves to restart determination processing, later described.

Next, at step 303, it is checked whether or not an in-focus state is determined in the aforementioned fine drive. If the in-focus state is determined, it is then checked at step 304 whether or not an in-focus direction is determined in the fine drive.

If the in-focus direction is not determined, the flow returns to step 302 and the fine drive is performed again. On the other hand, if the in-focus direction is determined, the flow proceeds to step 305 and "climbing drive" is started.

In the "climbing drive," the focus lens is driven in a predetermined drive amounts in a direction in which the AF evaluation value is increased, on the basis of the result of the direction determination with the aforementioned fine drive. At step 306, it is determined whether or not the AF evaluation value passes the peak. Specifically, it is determined whether or not the AF evaluation value is reduced after it is increased.

When it is determined that the AF evaluation value passes the peak, the flow proceeds to step 307. When it is not determined that the AF evaluation value passes the peak, the flow returns to step 305 to continue the climbing drive.

At step 307, since the focus lens passes the position at which the AF evaluation value is at the maximum (peak) by a predetermined drive amount, the focus lens is returned in the opposite direction by the predetermined drive amount. At step 308, it is determined again whether or not the AF evaluation value reaches the peak. When the result of the determination shows that it does not reach the peak, the flow returns to step 307 to continue the operation for returning to the peak of the AF evaluation value. When it reaches the peak, the point corresponds to an in-focus position.

After the in-focus position is determined in this manner, the flow returns to step 302 where the fine drive of the focus lens is performed to search for an in-focus position in the next frame of the moving image.

On the other hand, when it is determined that the in-focus state is determined at step 303, the focus lens 105 is stopped (step 313), and the AF evaluation vale when the focusing is achieved is stored in a memory, not shown (step 309). After that, processing of restart determination is performed.

In the restart determination processing, the current (latest) AF evaluation value is first taken at step 310. At step 311, the difference (the variation amount) is calculated between the previous AF evaluation value stored in the memory and the current AF evaluation value taken at step 310. If the variation amount is larger than a predetermined value, the flow returns to step 302 in order to perform the TV-AF again (restart), and the fine drive is started to search for a new in-focus position.

If the variation amount of the AF evaluation value is equal to or smaller than the predetermined value, it is determined that the in-focus state is maintained, and the focus lens is maintained in a stationary state (step 312). The flow returns to step 310 and a new AF evaluation value is taken.

Next, embodiments of the present invention are described with reference to the drawings.

Embodiment 1

Figure 1:
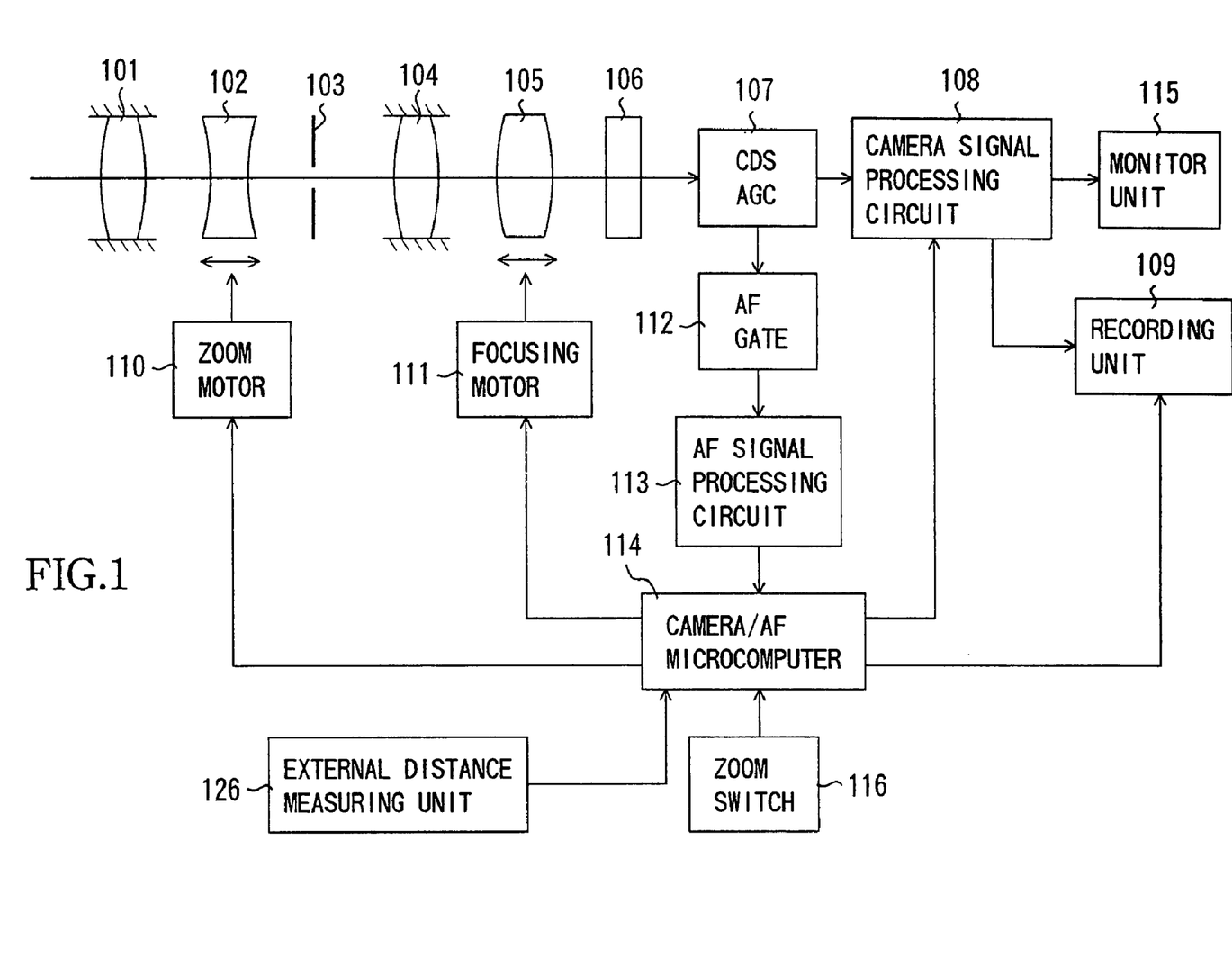
FIG. 1 is a block diagram showing the system structure of a video camera which is Embodiment 1 of the present invention.

FIG. 1 shows the structure of a video camera (an image-taking apparatus) which is Embodiment 1 of the present invention. While Embodiment 1 is described in connection with a video camera integral with an image-taking lens, the present invention is applicable to a video camera on which an image-taking lens is mountable. In this case, a control signal produced by a camera/AF microcomputer, later described, is communicated to a microcomputer in the image-taking lens such that the camera/AF microcomputer controls the drive of a focus lens unit through the lens microcomputer. In addition, while Embodiment 1 is described in connection with the video camera, the present invention is applicable to various types of image-taking apparatuses such as a digital still camera. This applies to Embodiment 2, later described.

In FIG. 1, reference numeral 101 shows a first fixed lens unit, reference numeral 102 shows a lens unit (hereinafter referred to as a zoom lens unit) which provides variable magnification, reference numeral 103 shows a stop, reference numeral 104 shows a second fixed lens unit, and reference numeral 105 shows a lens unit (hereinafter referred to as a focus lens unit) which has both of a focus adjusting function and a so-called compensator function of correcting the movements of an image surface due to varied magnification. An image-taking optical system constituted by these lens units is a rear focus optical system formed of the four lens units having a positive, a negative, a positive, a positive optical powers in order from an object side (the left side in FIG. 1). It should be noted that, while each lens unit is shown in FIG. 1 as it is formed of a single lens, each lens unit may might actually be formed of a single lens or a plurality of lenses.

The zoom lens 102 and the focus lens 105 are driven by a zoom motor 110 and a focusing motor 111, respectively, in an optical axis direction (the left-to-right direction in FIG. 1).

Incident light from an object passes through the lens units and the stop 101 to 105 to form an image on an image-pickup element 106. The image-pickup element 106 is a photoelectrical conversion element such as a CCD sensor and a CMOS sensor which converts the object image formed on an image-pickup surface into an electric signal. The electric signal output from the image-pickup element 106 is sampled by a CDS/AGC circuit 107 for gain adjustment and then input to a camera signal processing circuit 108.

The camera signal processing circuit 108 performs predetermined processing on the signal input from the CDS/AGC circuit 107 to produce a video signal appropriate for record and display in a recording unit 109 and on a monitor unit 115, respectively. The recording unit 109 records the video signal input thereto on a recording medium (such as a magnetic tape, an optical disc, and a semiconductor memory). The monitor unit 115 displays the video of the object on a display such as an electronic viewfinder and a liquid crystal panel based on the video signal input thereto.

On the other hand, the video signal output from the CDS/AGC circuit 107 is also input to an AF gate 112. The AF gate 112 selects a signal component associated with the area of a display screen for use in focus control out of the video signal corresponding to the whole screen, and outputs the selected signal component to an AF signal processing circuit (a first detector) 113. The area of the screen for use in focus control can be set arbitrarily, and a plurality of areas may be set.

The AF signal processing circuit 113 extracts an AF evaluation value signal (a focus evaluation value signal) such as a high-frequency component for use in focus control with the TV-AF method and a luminance difference component produced from the high-frequency signal component (a difference between the maximum and minimum in luminance level of the video signal) out of the input video signal, and outputs the extracted signal to a camera/AF microcomputer 114. The AF evaluation value signal represents the sharpness of the video based on the output signal from the image-pickup element 106. Since the sharpness changes with the focusing state of the image-taking optical system, the AF evaluation value signal consequently represents the focusing state of the image-taking optical system.

The camera/AF microcomputer 114 outputs a control signal to a focusing motor 111 to drive the focus lens unit 105 in small amounts in order to search for the position (an in-focus position) of the focus lens unit 105 at which the AF evaluation value is at the maximum level (at the maximum value or a value close thereto). This focus control is "TV-AF control" (in-focus search control: first control) and includes the "fine drive" and "climbing drive" described above.

The camera/AF microcomputer 114 is responsible for control of the entire video camera. The output from the aforementioned AF signal processing circuit 113 and an output from an external distance measuring unit (a second detector) 126, later described, are input to the camera/AF microcomputer 114 and used in calculations for AF control. The camera/AF microcomputer 114 outputs the control signal to the aforementioned focusing motor 111 in accordance with the calculation result to drive the focus lens unit 105.

The external distance measuring unit 126 is a sensor of an external metering type, specifically, a type in which the distance to an object is measured without using light passing through the image-taking optical system (the image-taking lens) and then a signal based on the distance is output. A distance sensor of a passive type can be used as the external distance measuring unit 126. In distance measurement of the passive type, a luminous flux from an object is split into two which are received by a set of line sensors to detect a displacement amount in signals output in accordance with the received light amounts, that is, a relative positional displacement amount in the direction in which the luminous flux is split, to determine the distance to the object with triangulation.

Figure 7:
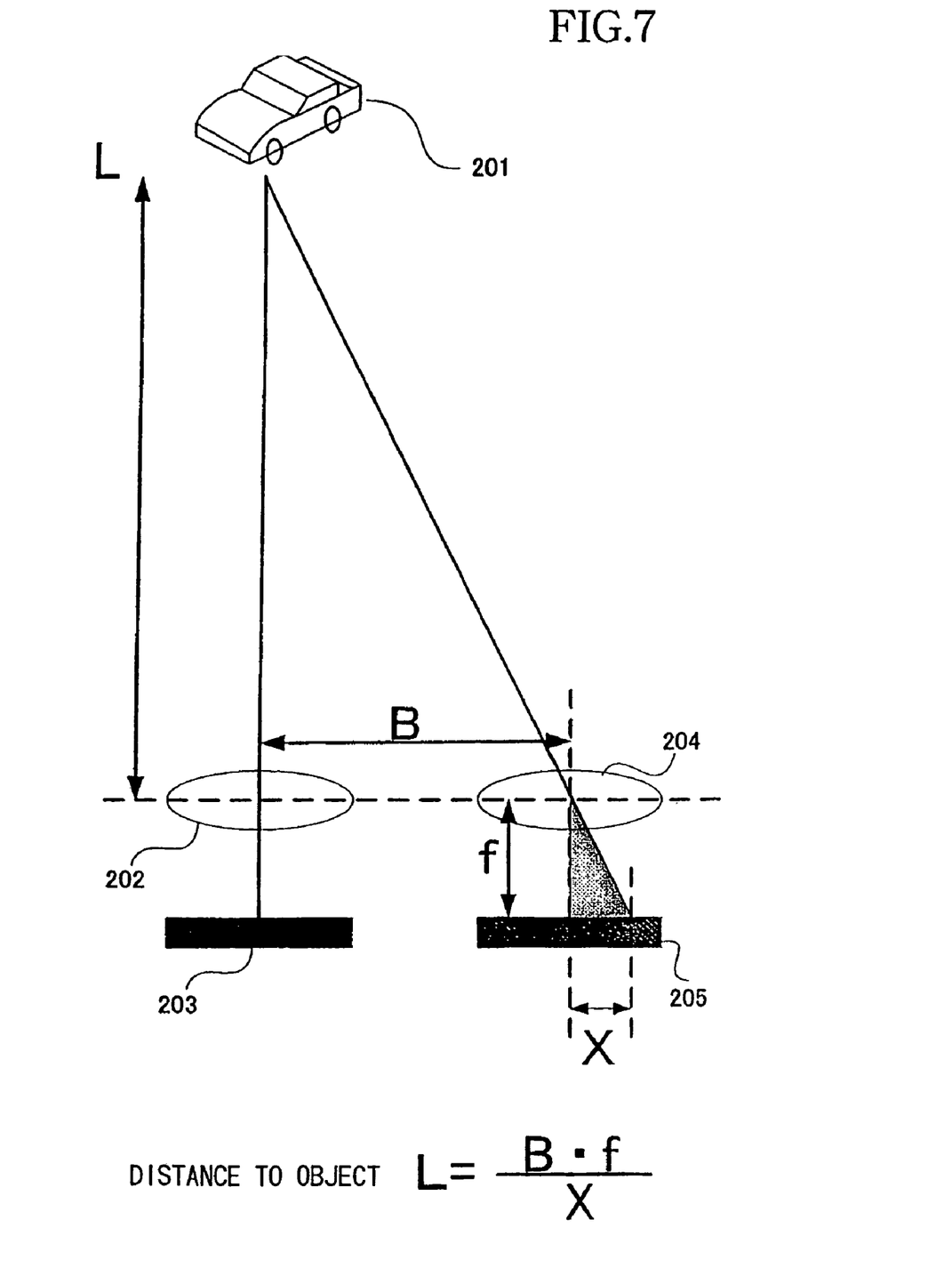
FIG. 7 is a diagram for explaining the principles of triangulation.
Figure 8:
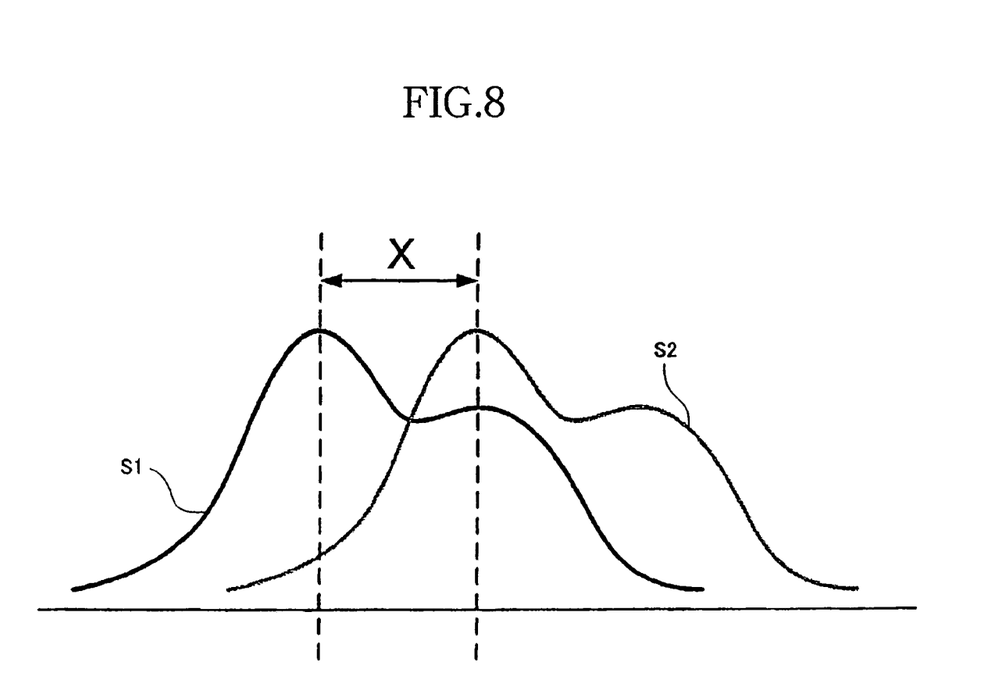
FIG. 8 is a diagram for explaining the principles of correlation calculations.

FIGS. 7 and 8 show the principles of distance calculations with triangulation. In FIG. 7, reference numeral 201 shows an object, reference numeral 202 shows an image-forming lens for a first optical path, reference numeral 203 shows a line sensor for the first optical path, reference numeral 204 shows an image-forming lens for a second optical path, and reference numeral 205 shows a line sensor for the second optical path. The line sensors 203 and 205 are disposed with the distance of a base line length B between them. Of the light from the object 201, light passing on the first optical path through the image-forming lens 202 is formed into an image on the line sensor 203, while light passing on the second optical path through the image-forming lens 204 is formed into an image on the line sensor 205. FIG. 8 shows examples of signals read from the line sensors 203 and 205 which receive the two object images formed through the first and second optical paths. Since the two line sensors are disposed with the distance of the base line length B between them, the resultant object image signals are displaced a pixel number X as apparent from FIG. 7. X can be calculated by calculating the correlation between two signals S1 and S2 while pixels are shifted and then determining the pixel shift amount with which the correlation is at the highest level. The distance L to the object can be calculated with triangulation as follows:

$$L=B\times f/X$$

based on the calculated X, the base line length B, and the focal length f of the image-forming lenses 202 and 204.

In addition to the distance measurement method of the passive type, distance measurement of an active type includes a method in which an ultrasonic sensor is used to determine the distance to an object from the measured propagation speed of ultrasonic waves, and a triangulation method often used in a compact camera in which infrared rays applied to an object are used. However, the second detector in the present invention is not limited to those with these distance measurement methods.

The camera/AF microcomputer 114 calculates an in-focus position of the focus lens unit 105 for achieving focusing based on the information on the distance to the object detected or measured with the detection signal from the external distance measuring unit 126 and information on the focal length of the image-taking optical system, or reads the in-focus position from table data, to calculate the deviation of the current position of the focus lens unit 105 from the in-focus position and the direction of the deviation. The calculation results of the deviation and the direction are hereinafter referred to as shift information.

The focus length can be provided from an output from a position sensor, not shown, for detecting the position of the zoom lens unit 102 or a drive pulse count of the zoom motor 110 from a reference position. The position of the focus lens unit 105 can be provided from an output from a position sensor, not shown, for detecting the position of the focus lens unit 105 or a drive pulse count of the focusing motor 111 from a reference position.

The aforementioned calculation results of the deviation and the direction (the shift information) are used to provide a drive amount and a drive direction for driving the focus lens unit 105 to the in-focus position. The control in which the focus lens unit 105 is driven in accordance with the drive amount and the drive direction is referred to as "in-focus drive amount control," which is second control.

Figure 3:
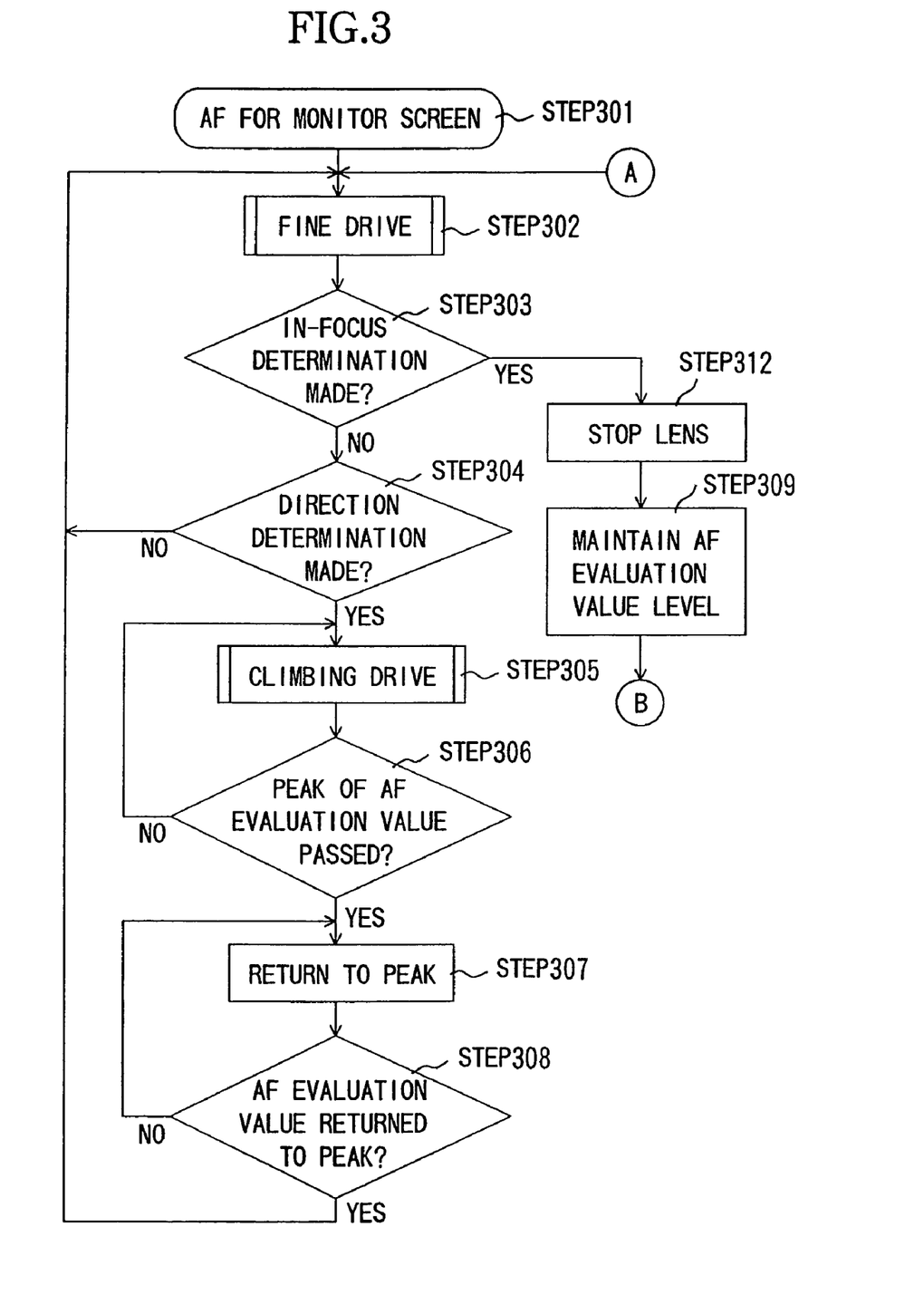
FIG. 3 is a flow chart showing the control algorithm of TV-AF in Embodiment 1.
Figure 4:
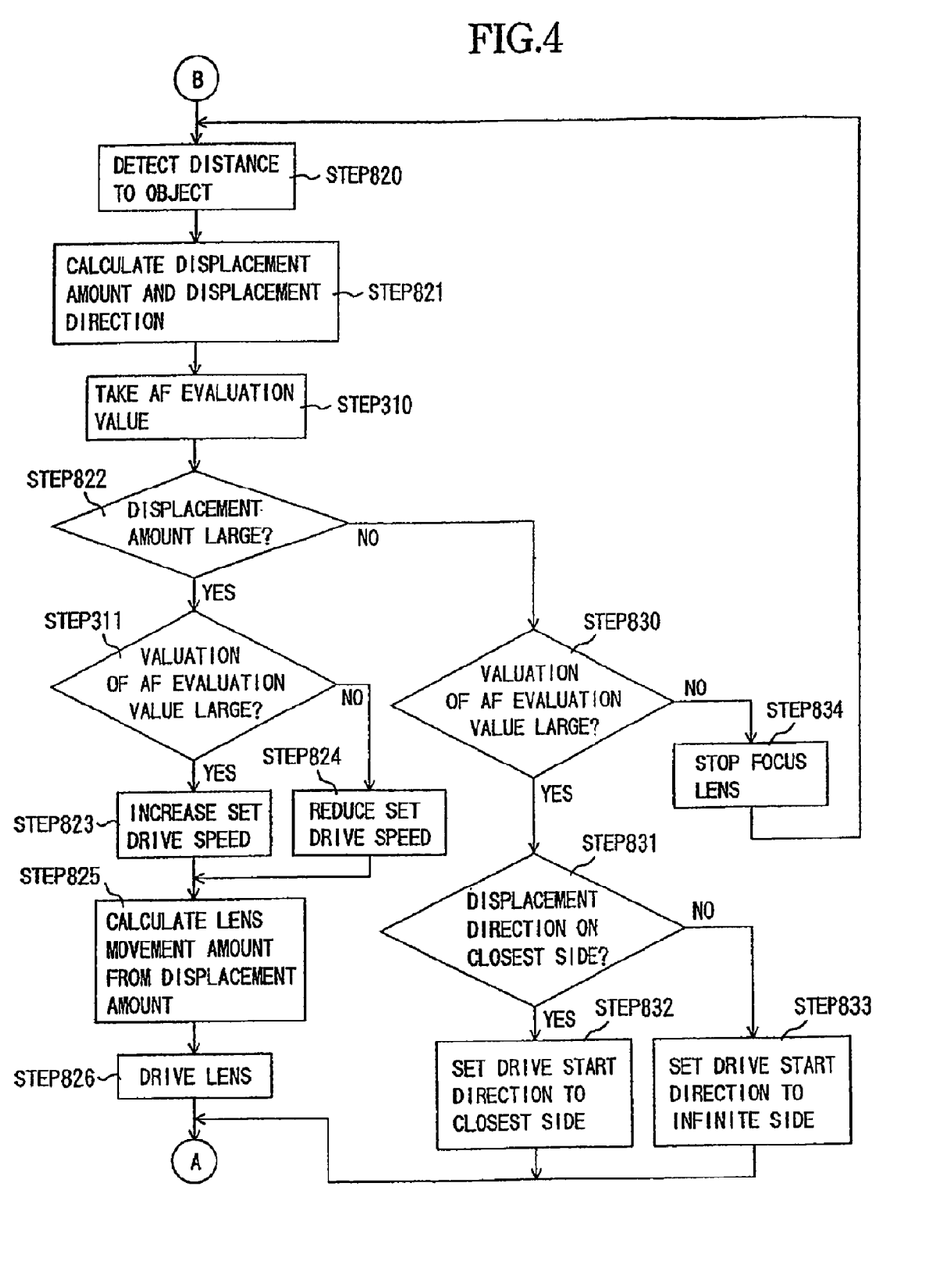
FIG. 4 is a flow chart showing the algorithm of restart determination/setting processing of the TV-AF in Embodiment 1.

Next, detailed description is made for the TV-AF control performed in the camera/AF microcomputer 114 with reference to FIGS. 3 and 4. In FIGS. 3 and 4, the same circled characters indicate links there between. The steps identical to those described in the premise technology (FIG. 6) are designated with the same reference numerals and brief description is made therefor.

In FIG. 3, after the control operation is started at step 301, the camera/AF microcomputer 114 performs "fine drive" and determines whether or not an in-focus state is determined in the fine drive (step 303) and whether or not an in-focus direction is determined (step 304). If the in-focus state is not determined but the direction is determined, "climbing drive" is performed (step 305), and the focus lens unit 105 is driven to the position (the in-focus position) where the AF evaluation value is at the peak (steps 306 to 308). Then, the flow returns to step 302, and if it is determined that the in-focus state is determined at step 303, the flow proceeds to step 312 where the focus lens unit 105 is stopped to end the first operation of the TV-AF control.

Next, to determine whether or not the TV-AF control is re-started (re-performed), the AF evaluation value (the peak value) when the focusing is achieved in the first TV-AF control is stored in a memory, not shown, at step 309. Thereafter, restart determination/setting processing, later described, is performed.

FIG. 4 shows the details of the restart determination/setting processing. First, the camera/AF microcomputer 114 takes information about the distance to an object based on a detection signal from the external distance measuring unit 126 (step 820). At step 821, the camera/AF microcomputer 114 calculates the in-focus position of the focus lens unit 105 based on the distance information as described above, and calculates shift information which includes a displacement amount (a shift amount) of the current position (the actual position) of the focus lens unit 105 from the in-focus position and a displacement direction (a shift direction) indicating the direction in which the in-focus position exists relative to the current position.

Next, at step 310, the present (latest) AF evaluation value is taken.

Then, at step 822, it is determined whether or not the displacement amount in the shift information calculated at step 821 is larger than a first predetermined value. The "first predetermined value" is a value at which the TV-AF control needs to be restarted regardless of the variation amount of the AF evaluation value determined later, that is, a value corresponding to the minimum value of the displacement amount considered as apparent deviation from an in-focus state.

The mere fact of the displacement amount of the focus lens unit 105 from the in-focus position being larger than the first predetermined value means that the current position of the focus lens unit 105 is displaced by a certain amount from the in-focus position. In this case, the in-focus position search with the TV-AF control may require a long time before in-focus determination. To address this, in Embodiment 1, the aforementioned "in-focus drive amount control" is performed prior to restart of the TV-AF control in such a case.

A situation may occur in which it is determined that the distance to an object is changed but the current video includes no blurring (the variation amount of the AF evaluation value is small), for example when the focus lens unit 105 is focused on a subject different from a true object at a changed distance. In such a case, however, the distance to the object is changed and the focus lens unit 105 is not located at the accurate in-focus position, so that the focus lens unit 105 needs to be moved to the accurate in-focus position. In this case, since moving the focus lens unit 105 extremely fast may cause significant blurring in the video, a relatively low drive speed is preferably set.

When the camera/AF microcomputer 114 determines that the displacement amount is larger than the first predetermined value at step 822, the flow proceeds to step 311 where the camera/AF microcomputer 114 calculates the difference (the variation amount) between the previous AF evaluation value stored in the memory and the current AF evaluation value taken at step 310 to determine whether or not the calculated variation amount is larger than a second predetermined value. The "second predetermined value" is set to the maximum value in the AF evaluation value variation amounts which can be considered as an in-focus range in the TV-AF control.

When the variation amount of the AF evaluation value is larger than the second predetermined value, the flow proceeds to step 823. When the displacement amount of the focus lens unit 105 from the in-focus position is larger than the first predetermined value and the variation amount of the AF evaluation value is larger than the second predetermined value, the focusing state of the image-taking optical system is significantly deviated from the in-focus state at the current position of the focus lens unit 105. In other words, the focus lens unit 105 needs to be moved for a relatively large amount. To drive the focus lens unit 105 at high speed near to the in-focus position, the drive speed of the focus lens unit 105 (that is, the drive speed of the focusing motor 111) in the "in-focus drive amount control" is set to a speed (a first drive speed) between the maximum speed and a predetermined intermediate speed in a permitted speed range at step 823. The drive speed is set in this case in accordance with the displacement amount calculated at step 821 such that a higher speed is set as the displacement amount is larger. Alternatively, the maximum speed may be set in any case.

On the other hand, when the variation amount of the AF evaluation value is equal to or smaller than the second predetermined value at step 311, the flow proceeds to step 824 where the drive speed of the focus lens unit 105 in the "in-focus drive amount control" is set to a speed (a second drive speed) lower than the predetermined intermediate speed in the permitted speed range. The focus lens unit 105 is slowly driven, so that it is moved to the exact in-focus position while significant blurring of video is prevented.

After the drive speed is set at step 823 or 824, the flow proceeds to step 825 where the camera/AF microcomputer 114 calculates the drive amount of the focus lens unit 105 to the in-focus position based on the displacement amount in the shift information (or read it from table data) to drive the focus lens unit 105 for the calculated drive amount in the same direction as the displacement direction in the shift information (step 826). Thus, the focus lens unit 105 is moved near to the in-focus position which should be searched for with the TV-AF.

Thereafter, the flow proceeds to step 302 in FIG. 3 to re-perform (restart) the "fine drive" and the "climbing drive" in the TV-AF. In this manner, the focus lens unit 105 can be moved to the new (accurate) in-focus position at high speed.

When the displacement amount in the shift information is equal to or smaller than the first predetermined amount at step 822, the flow proceeds to step 830 where it is determined whether or not the variation amount of the AF evaluation value is larger than the second predetermined value.

When it is determined that the variation amount of the AF evaluation value is larger than the second predetermined value, the TV-AF is immediately restarted without performing the aforementioned "in-focus drive amount control." Before that, it is determined whether or not the displacement direction in the shift information (the direction of the in-focus position relative to the current position) lies on the closest side at step 831. If it lies on the closest side, the flow proceeds to step 832 where a drive start direction of the focus lens unit 105 is set to the closest side in the "fine drive" of the TV-AF. If the displacement direction lies on the infinite side, the drive start direction of the focus lens unit 105 is set to the infinite side in the "fine drive."

This setting can eliminate temporary drive of the focus lens unit 105 in an erroneous direction in the "fine drive" in the restarted TV-AF. It is thus possible to move the focus lens unit 105 in the shortest possible time to the target in-focus position.

On the other hand, when the variation amount of the AF evaluation value is equal to or smaller than the second predetermined value (when the displacement amount in the shift information is equal to or smaller than the first predetermined value and the variation amount of the AF evaluation value is equal to or smaller than the second predetermined value) at step 830, it is determined that the accurate in-focus position is maintained and the flow proceeds to step 834. The restart of the TV-AF is not performed (that is, the restart is inhibited), and the flow proceeds to step 820 where the processing of the restart determination is repeated.

Embodiment 2

Figure 2:
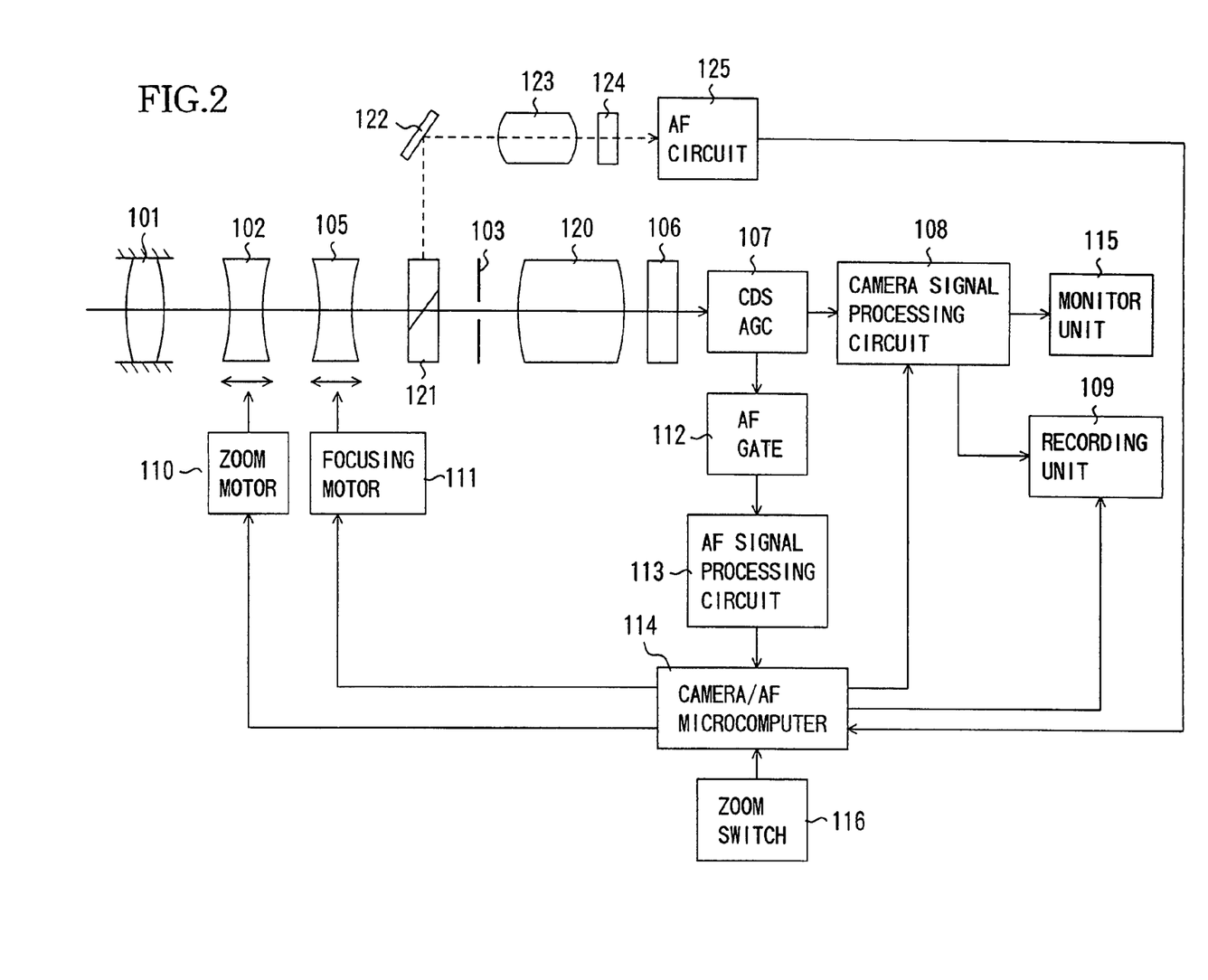
FIG. 2 is a block diagram showing the system structure of a video camera which is Embodiment 2 of the present invention.

FIG. 2 is a block diagram showing the system structure of a video camera (an image-taking apparatus) which is Embodiment 2 of the present invention. In Embodiment 2, components identical to those in Embodiment 1 described above are designated with the same reference numerals and the description thereof is omitted.

While Embodiment 1 has been described for the case where the external distance measuring unit 126 is used as the second detecting means, Embodiment 2 is described for the case where a TTL (through the lens) phase difference detection unit is used.

An image-taking optical system of Embodiment 2 is formed of a first fixed lens unit 101, a zoom lens unit 102, a focus lens unit 105, a stop 103, and an image-forming lens unit 120, disposed in order from an object side (the left side in FIG. 2). The image-taking optical system constituted by these lens units is a rear focus optical system formed of the four lens units having a positive, a negative, a negative, a positive optical powers in order from the object side. It should be noted that, while each lens unit is shown in FIG. 2 as it is formed of a single lens, each lens unit may actually be formed of a single lens or a plurality of lenses.

Reference numeral 121 shows a half prism which is disposed between the focus lens unit 105 and the stop 103 and splits light for auto-focus to guide one of the split light components to a phase difference detection unit, later described, through a submirror 122.

The phase difference detection unit is formed of an AF image-forming lens 123 which forms a luminous flux from the submirror 122 into an image, and an AF circuit 125 which has a pair of line sensors (AF sensors) 124 for realizing a phase difference detection method.

A camera/AF microcomputer 114 calculates a defocus amount and a defocus direction of the image-taking optical system as shift information from a phase difference signal representing a displacement amount of two images formed on the pair of AF sensors 124 through the AF circuit 125.

In the video camera of such a structure, the stop 103 is operating while moving images are taken, so that the half prism 121 needs to split a luminous flux incident on the image-taking optical system before the stop 103.

In Embodiment 2, an algorithm similar to that described in Embodiment 1 can be employed to perform restart determination processing of TV-AF. Specifically, in the shift information used at steps 822, 825, and 831 in FIG. 4 (the shift information calculated at step 821), the displacement amount and the displacement direction of the focus lens unit 105 relative to the in-focus position calculated on the basis of the output signal of the external distance measuring unit 126 are replaced with the defocus amount and the defocus direction calculated on the basis of the phase difference signal.

In each of Embodiments 1 and 2, when the variation amount of the AF evaluation value is determined at step 830 in FIG. 4 the drive speed in the "fine drive" may be changed in accordance with the variation amount of the AF evaluation value. Preferably, a higher drive speed may be set when the variation amount of the AF evaluation value is significantly larger than the second predetermined value, and a lower drive speed may be set when the variation amount is slightly larger than the second predetermined value. This allows the focus lens unit 105 to be moved quickly to the in-focus position through the restart of the TV-AF.

When the displacement amount in the shift information is equal to or lower than the first predetermined value at step 822, it is determined that the displacement from the in-focus position is small due to a small change in the distance to the object. Thus, the second predetermined value which is the determination threshold value at step 830 can be set to be small such that emphasis may be put on the variation of the AF evaluation value as a determination criterion. This can improve focusing accuracy.

It is possible to store the position of the focus lens unit 105 relative to the object distance for each focal length in Embodiment 1 and the movement amount of the focus lens unit 105 relative to the defocus amount for each focal length in Embodiment 2 in a memory external to the microcomputer 114 or an internal memory area within the microcomputer 114. With this storage, only reading the stored data is required at step 825 where the drive amount of the focus lens unit 105 is calculated, so that the processing operation can be performed more quickly as compared with the case where calculations are performed with expressions.

It is also possible to use a relationship based on the depth of focus in determining the displacement amount of the focus lens unit 105 from the in-focus position at step 822. In this case, the relationship between the displacement amount or the phase difference and the depth of focus may be stored previously in the external memory or the internal memory area for each focal length and stop value. This improves the speed of the determination of whether or not focusing is achieved. In addition, it is possible to prevent erroneous operation such as driving the focus lens unit 105 for a large amount even when significant blurring does not occur. The depth of focus is small with a small focal length, so that blurring occurs even with a small displacement amount. Since the depth of focus is large with a large focal length, no blurring occurs with a small displacement amount.

As described above, according to each of Embodiments 1 and 2, the determination of the restart can be performed reliably in the restart processing after the in-focus state in the TV-AF by using the two determination criteria of the shift information from the in-focus state provided with the external distance measuring method or the phase difference detection method and the AF evaluation value.

When the restart is needed, and the displacement amount (in the shift information) provided with the external distance measuring method or the phase difference detection method is larger than the first predetermined value and the variation amount of the AF evaluation value is larger than the second predetermined value, the displacement amount is relied on to set the drive speed of the focus lens unit 105 in the in-focus drive amount control performed prior to the restart of the TV-AF. This can reduce the time before the TV-AF performed subsequently and achieve a more accurate in-focus position. When the displacement amount provided with the external distance measuring method or the phase difference detection method is larger than the first predetermined value and the variation amount of the AF evaluation value is smaller than the second predetermined value, the drive speed of the focus lens unit 105 can be reduced in the in-focus drive amount control to move the focus lens unit 105 to the in-focus position with reduced blurring, thereby improving the stability of the focusing state and performing more accurate drive of the lens to the in-focus position.

When the displacement amount provided with the external distance measuring method or the phase difference detection method is smaller than the first predetermined value and the variation amount of the AF evaluation value is larger than the second predetermined value, the drive start direction of the focus lens unit 105 can be set in the restarted TV-AF (the fine drive) depending on the displacement direction provided with the external distance measuring method or the phase difference detection method to accurately start the movement of the focus lens unit 105 to the in-focus position. In this case, quicker restart processing can be performed by changing the drive speed in the fine drive in accordance with the variation amount of the AF evaluation value.

In addition, according to each of Embodiments 1 and 2, the various processing associated with the re-performance of the in-focus search control (the TV-AF control) is performed, at least with reference to the shift information provided on the basis of the detection signal (such as the signal representing the object distance and the phase difference signal) different from the focus evaluation value signal. It is thus possible to maintain an in-focus state accurately even when a condition change, which could not be dealt with conventionally only through the in-focus search control, occurs.

Specifically, whether the in-focus search control is re-performed or not is determined on the basis of the shift information, so that the in-focus search control can be re-performed even in a condition in which re-start would not be performed with the conventional re-performance (restart) determination.

Whether the in-focus drive amount control is performed or not is determined before the re-performance of the in-focus search control based on the shift information. Even when the distance to the object is greatly changed, the focus lens is first moved quickly near to the in-focus position, and then moved to the in-focus position through the re-performance of the in-focus search control thereafter, which enables an accurate in-focus state to be achieved in a short time.

Since the drive speed of the focus lens is controlled in the in-focus drive amount control based on the focus evaluation value signal and the shift information, the focus lens can be driven at a speed appropriate for the drive amount of the focus lens. Consequently, it is possible to avoid disadvantages such as passing the in-focus position (which causes blur) by driving the focus lens quickly for a small drive amount and taking a long time to achieve an in-focus state by driving the focus lens slowly for a large drive amount.

Furthermore, the drive start direction of the focus lens can be controlled in re-performing the in-focus search control based on the information representing the shift direction in the shift information, so that a wrong drive direction of the focus lens can be prevented in the initial stage of the re-performance to achieve the in-focus state in a shorter time.

While preferred embodiments have been described, it is to be understood that modification and variation of the present invention may be made without departing from the scope of the following claims.

"This application claims priority from Japanese Patent Application No. 2003-317294 filed on Sep. 9, 2003, which is hereby incorporated by reference herein."

What is claimed is:

1. An image-taking apparatus comprising:
an image-pickup element which photoelectrically converts an object image formed by an image-taking optical system which includes a focus lens;
a first detector which outputs a focus evaluation value signal which represents a focusing state of the image-taking optical system based on a predetermined frequency component of an output signal from the image-pickup element;

a second detector which outputs information about a distance to an object with triangulation; and a controller which performs a first control for moving the focus lens to a position at which the focus evaluation value signal is at a relatively large level, wherein the controller obtains shift information which represents a shift state from an in-focus state based on the information about the distance to the object with triangulation from the second detector after the first control, and performs processing associated with re-performance of the first control based on at least the shift information.

2. The image-taking apparatus according to claim 1, wherein the controller determines whether or not the first control is re-performed on the basis of at least the shift information as the processing.

3. The image-taking apparatus according to claim 2, wherein the controller re-performs the first control in a case where a value representing a shift amount in the shift information is larger than a first predetermined value.

4. The image-taking apparatus according to claim 3, wherein the controller changes the first predetermined value in accordance with information on a depth of focus of the image-taking optical system.

5. The image-taking apparatus according to claim 2, wherein the controller re-performs the first control in a case where a value representing a shift amount in the shift information is smaller than a first predetermined value and a variation amount of the focus evaluation value signal is larger than a second predetermined value, and inhibits re-performance of the first control in a case where the value representing the shift amount is smaller than the first predetermined value and the variation amount of the focus evaluation value signal is smaller than the second predetermined value.

6. The image-taking apparatus according to claim 5, wherein the controller changes the first predetermined value in accordance with information on a depth of focus of the image-taking optical system.

7. The image-taking apparatus according to claim 1, wherein the controller performs a second control for determining a drive amount of the focus lens to reach an in-focus position based on the shift information and controlling drive of the focus lens based on the drive amount, and the controller determines whether or not the second control is performed before re-performance of the first control based on the shift information as the processing.

8. The image-taking apparatus according to claim 7, wherein the controller performs the second control before the first control is re-performed in a case where a value representing a shift amount in the shift information is larger than a first predetermined value.

9. The image-taking apparatus according to claim 8, wherein the controller controls a drive speed of the focus lens in the second control based on the focus evaluation value signal.

10. The image-taking apparatus according to claim 9, wherein the controller sets the drive speed of the focus lens to a first drive speed in a case where a variation amount of the focus evaluation value signal is larger than a second predetermined value, and sets the drive speed of the focus lens to a second drive speed lower than the first drive speed in a case where the variation amount of the focus evaluation value signal is smaller than the second predetermined value.

11. The image-taking apparatus according to claim 8, wherein the controller changes the first predetermined value in accordance with information on a depth of focus of the image-taking optical system.

12. The image-taking apparatus according to claim 1, wherein the controller performs a second control for determining a drive amount of the focus lens to reach an in-focus position based on the shift information and controlling drive of the focus lens based on the drive amount and performs the second control before the first control, and the controller controls a drive speed of the focus lens in the second control based on the shift information as the processing.

13. The image-taking apparatus according to claim 12, wherein the controller sets a higher drive speed of the focus lens in the second control as a value representing a shift amount in the shift information is larger.

14. The image-taking apparatus according to claim 1, wherein the controller controls a drive start direction of the focus lens in re-performance of the first control based on information representing a shift direction in the shift information as the processing.

15. The image-taking apparatus according to claim 14, wherein the controller controls the drive start direction of the focus lens in a case where a value representing a shift amount in the shift information is smaller than a first predetermined value and a variation amount of the focus evaluation value signal is larger than a second predetermined value.

16. The image-taking apparatus according to claim 15, wherein the controller changes the first predetermined value in accordance with information on a depth of focus of the image-taking optical system.

17. The image-taking apparatus according to claim 14, wherein the controller controls a drive speed of the focus lens in the first control in accordance with a variation amount of the focus evaluation value signal.

18. A focus control method performed by an image-taking apparatus comprising an image-pickup element which photoelectrically converts an object image formed by an image-taking optical system which includes a focus lens, the method comprising:

a step of producing a focus evaluation value signal which represents a focusing state of the image-taking optical system based on a predetermined frequency component of an output signal from the image-pickup element;

a step of inputting information about a distance to an object with triangulation;

a step of performing a first control for moving the focus lens to a position at which the focus evaluation value signal is at a relatively large level;

a step of obtaining shift information which represents a shift state from an in-focus state based on the information about the distance to the object with triangulation after the first control is performed; and a step of performing processing associated with re-performance of the first control based on at least the shift information.

19. An image-taking apparatus comprising:

an image-pickup element which photoelectrically converts an object image formed by an image-taking optical system which includes a focus lens;

a first detector which outputs a focus evaluation value signal which represents a focusing state of the image-taking optical system based on a predetermined frequency component of an output signal from the image-pickup device;

a second detector which outputs information about a distance to an object with triangulation; and a controller which performs a first control for moving the focus lens to a position at which the focus evaluation value signal is at a relatively large level, wherein the controller obtains a shift amount from an in-focus state based on the information about the distance to the object with triangulation from the second detector after the first control, and performs processing associated with re-performance of the first control based on the shift amount.

20. A focus control method performed by an image-taking apparatus comprising an image-pickup element which photoelectrically converts an object image formed by an image-taking optical system which includes a focus lens, the method comprising:

a step of producing a focus evaluation value signal which represents a focusing state of the image-taking optical system based on a predetermined frequency component of an output signal from the image-pickup element;

a step of inputting information about a distance to an object with triangulation;

a step of performing a first control for controlling drive of the focus lens to search for an in-focus position of the focus lens at which the focus evaluation value signal is at the maximum level;

a step of obtaining a shift amount from an in-focus state based on the information about the distance to the object with triangulation after the first control is performed, and performing a process associated with re-performance of the first control based on the shift amount.

* * * * *